Patented Oct. 12, 1948

2,451,370

UNITED STATES PATENT OFFICE 2,451,370

LONG-CHAIN SECONDARY ALKYL N-SUBSTITUTED POLYMERIC STYRENE/MALEAMIC ACIDS AND DISPERSIONS CONTAINING THEM

Witty Lysle Alderson, Jr., Wilmington, Del., assignor to E. I. du Pont de Nemours & Company, Wilmington, Del., a corporation of Delaware No Drawing. Application April 30, 1946,
Serial No. 666,176

9 Claims. (Cl. 260—78)

This invention relates to dispersing agents, to coating compositions containing such dispersing agents, and to methods for rendering textiles water-repellent. More particularly this invention relates to new N-substituted polymeric amic acids which are effective in rendering textiles water-repellent, to textile materials rendered water-repellent thereby, and to methods for the preparation of the new N-substituted polymeric amic acids.

An object of this invention is to provide new N-substituted polymeric amic acids and methods for their preparation. A further object of this invention is to provide selected N-substituted polymeric amic acids that are effective in rendering textile materials water-repellent. Another object is to provide coating compositions containing novel dispersing agents and methods for rendering textiles water-repellent. An additional object is to provide water-repellent coatings and water-repellent textile materials. Other objects will appear hereinafter.

These objects are accomplished by N-substituted polymeric amic acids obtainable by reacting one mole equivalent of a styrene/maleic anhydride interpolymer with from 0.2 to 0.6 mole equivalent of long chain secondary alkyl amines and from 0.8 to 0.4 mole equivalent of one or more substances selected from the class consisting of ammonia and lower primary amines. The ammonium salts of these N-substituted polymeric amic acids are obtainable by reacting them with gaseous or aqueous ammonia, for example 28% ammonium hydroxide. The equivalent molecular weight of the styrene/maleic anhydride interpolymer is considered as being that of the structural unit, that is

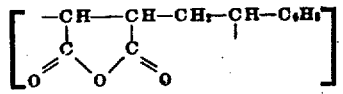

In a preferred method of preparing the N-substituted polymeric amic acids, the styrene/maleic anhydride polymer is reacted with from 0.2 to 0.6 mole equivalent of a long chain secondary alkyl amine at a temperature in the range of from 20° to 150° C., in the presence of a suitable solvent for the styrene/maleic anhydride polymer; e. g., methyl ethyl ketone, acetone, or dioxane, the reaction mixture is cooled to room temperature and then there is added from 0.8 to 0.4 mole equivalent of one or more substances selected from the class consisting of ammonia and the lower primary amines. The reaction may be carried out by reacting the styrene-maleic anhydride interpolymer with a mixture of a long chain secondary alkyl amine and one or more of the substances ammonia and lower primary amines in the specified mole proportions. The resulting product is isolated by filtration or by other means known to the art.

By "long chain secondary alkyl amine" as used herein is meant secondary alkyl amines in which the total number of carbon atoms in the combined alkyl groups is at least 18.

By "lower primary amine" as used herein is meant primary amines in which the total number of carbon atoms in the hydrocarbon group is less than seven. Lower primary amines of this type may be alkyl amines, aryl amines, aralkyl amines, or cycloaliphatic amines.

The new products of this invention include N-substituted polymeric styrene/maleamic acids or their ammonium salts in which 20 to 60% of the amide nitrogen atoms have two aliphatic hydrocarbon substituents containing a total of at least 18 carbon atoms in their combined chains and the residual amide groups are selected from the class consisting of unsubstituted amide groups and amide groups having a single monovalent hydrocarbon substituent containing not more than six carbon atoms. Particularly preferred new N-substituted polymeric styrene/maleamic acids are those in which 40 to 50% of the amide nitrogen atoms have two aliphatic hydrocarbon substituents containing a total of at least 18 carbon atoms in their combined chains and in which 60% to 50% of the amide nitrogen atoms are unsubstituted or contain a short chain alkyl group.

The styrene/maleic anhydride interpolymers used in the practice of this invention are those obtained by reacting one mole of maleic anhydride with at least one mole of styrene as described in U. S. Patents 2,047,398 issued July 14, 1936, and 2,378,629 issued June 19, 1945. In the practice of this invention it is generally preferred to use styrene/maleic anhydride interpolymers ranging in viscosity from 0.2 to 650 centipoises at 25° C., when measured as a 15% solution in methyl ethyl ketone. It is especially desirable to select styrene/maleic anhydride polymers which range in viscosity from 50 to 200 centipoises at 25° C., when measured as 15% solutions in methyl ethyl ketone, because the best amic acids from the standpoint of ease of application to textiles are so obtained. The mixed N-substituted polymeric amic acids that are preferred because they are dispersible in water and at the same time are outstanding in imparting water-repellency to textiles, are those obtainable by reacting one mole equivalent of styrene/maleic anhydride polymer with from 0.4 to 0.5 mole equivalent of a long chain secondary alkylamine and from 0.6 to 0.5 mole equivalent of one or both of the substances ammonia and a lower primary amine.

This invention is further illustrated by the following examples in which the amounts, unless otherwise stated, are expressed in parts by weight.

Example I

Twenty parts of a styrene/maleic anhydride polymer having a viscosity of about 100 centipoises (measured as a 15% solution at 25° C. in methyl ethyl ketone) and 23.4 parts of dioctadecylamine are dissolved in 250 parts of methyl ethyl ketone. The solution is refluxed for 2 hours, allowed to cool to room temperature, and then stirred vigorously with 80 parts of 28% ammonium hydroxide. The ammonium salt of the amic acid that precipitates is collected on a filter, washed thoroughly with methyl ethyl ketone and dried.

The above example is duplicated using ditetradecylamine with similar results.

Example II

Twenty parts of the styrene/maleic anhydride polymer of Example I and 23.4 parts of dioctadecylamine are reacted as described in Example I. Three and eight tenths parts of neopentylamine is added and the mixture is allowed to stand for 12 hours at room temperature. The solution is stirred and 30 parts of 28% ammonium hydroxide is added and the amic acid ammonium salt which separates is collected and dried.

The above experiment is duplicated substituting dihexadecylamine for the dioctadecylamine with analogous results.

The above example is duplicated substituting methylamine for the neopentylamine with analogous results.

Example III

Twenty parts of the styrene/maleic anhydride polymer of Example I and 23.4 parts of dioctadecylamine are dissolved in 250 parts of methyl ethyl ketone. To the solution there is added 4.4 parts of aniline and the mixture is allowed to stand at room temperature for 12 hours. Thirty parts of 28% ammonium hydroxide is then added to the reaction mixture. The product which separates is collected and dried.

The above example is duplicated substituting methyloctadecylamine for the dioctadecylamine with analogous results.

The above example is duplicated substituting diheptadecylamine for the dioctadecylamine with analogous results.

The above example is duplicated substituting dihexadecylamine for the dioctadecylamine with analogous results.

The above example is duplicated substituting cyclohexylamine for the aniline with analogous results.

The compositions of the above examples are evaluated for their effectivenes as water repellents for textiles in the following manner.

Five per cent aqueous dispersions of the ammonium salts of the amic acids were prepared by stirring their ammonium salts with aqueous ammonium hydroxide at 50–60° C. Nine ounce cotton sateen was then impregnated with these systems in such a manner that the cloth imbibed approximately its own weight of dispersion. The fabrics were then baked for 5 minutes at 170–180° C. in a forced draft oven. The effectiveness of the products as water repellents is shown in the table below. In the table "Control" refers to the untreated fabric and the spray rating value 100 indicates that the fabric is 100% water-repellent.

| Product of— | Percent Solids on Fabric | Spray Ratings |
|---|---|---|
| Example I | 5 | 100 |
| Example II | 5 | 90 |
| Example III | 5 | 100 |
| Control | 0 | 50 |

The spray rating values are obtained as described in American Dyestuffs Reporter, 30, 6–14 (1941).

Although in the above test the N-substituted amic acids were applied in the form of aqueous dispersions of their ammonium salts it is to be understood that they can also be applied with analogous results from solutions or suspensions in organic solvents, such as methyl ethyl ketone, dioxane, and the like.

The N-substituted amic acids can be used in the form of solutions or dispersions containing from 2 to 20% solids. Usually, however, satisfactory results are obtained using dispersions or solutions containing from 5 to 10% of the amic acid.

Although it is not necessary, it is sometimes desirable to incorporate in the N-substituted amic acid dispersions auxiliary dispersing agents, penetrants, pigments, and other modifiers to obtain optimum results.

In order to take full advantage of the water-repellent capacity of the herein described N-substituted amic acids, it is desirable to heat fabrics that have been impregnated with liquids containing in dispersion or solution these products. The conditions of heating will depend on the chemical nature of the amic acid in question, the type of fabric and the type of equipment employed. Generally speaking, conditions should be chosen that will cause the temperature of the treated fabric to rise within the range of 100–180° C. If an efficient forced draft oven is used, this can be accomplished by an exposure of from 1 to 5 minutes at 150–180° C.

As many apparently widely different embodiments of this invention may be made without departing from the spirit and scope thereof, it is to be understood that I do not limit myself to the specific embodiments thereof except as defined in the appended claims.

I claim:

1. A process for the preparation of N-substituted polymeric amic acids which comprises reacting one mole equivalent of a styrene/maleic anhydride interpolymer, having a viscosity from 0.2 to 650 centipoises at 25° C. measured as a 15% solution in methyl ethyl ketone, in a solvent at a temperature of 20 to 150° C., with from 0.2 to 0.6 mole equivalent of a long chain secondary alkyl amine having a total of at least 18 carbon atoms in the combined alkyl groups, then adding to the reaction products from 0.8 to 0.4 mole equivalent of at least one of the substances selected from the class consisting of ammonia and lower primary amines containing less than seven carbon atoms.

2. An N-substituted polymeric styrene/maleamic acid in which 20 to 60% of the amide nitrogen atoms have two aliphatic hydrocarbon substituents containing a total of at least 18 carbon atoms in their combined chains, and in which each of the residual amide groups is selected from the class consisting of unsubstituted amide groups and amide groups having a single monovalent hydrocarbon substituent containing less than seven carbon atoms.

3. An N-substituted polymeric styrene/maleamic acid in which 40 to 50% of the amide nitrogen atoms have two aliphatic hydrocarbon substituents containing a total of at least 18 carbon atoms in their combined chains, and in which each of the residual amide groups is selected from the class consisting of unsubstituted amide groups and amide groups having a single monovalent hydrocarbon substituent containing less than seven carbon atoms.

4. A coating composition containing a liquid in which is dispersed from 2 to 20% by weight of the ammonium salt of an N-substituted polymeric styrene/maleamic acid in which 20 to 60% of the amide nitrogen atoms have two aliphatic hydrocarbon substituents containing a total of at least 18 carbon atoms in their combined chains, and in which each of the residual amide groups is selected from the class consisting of unsubstituted amide groups and amide groups having a single monovalent hydrocarbon substituent containing less than seven carbon atoms.

5. A coating composition containing a liquid in which is dispersed from 2 to 20% by weight of the ammonium salt of an N-substituted polymeric styrene/maleamic acid in which 40 to 50% of the amide nitrogen atoms have two aliphatic hydrocarbon substituents containing a total of at least 18 carbon atoms in their combined chains, and in which each of the residual amide groups is selected from the class consisting of unsubstituted amide groups and amide groups having a single monovalent hydrocarbon substituent containing less than seven carbon atoms.

6. A method for rendering textiles water-repellent which comprises impregnating a textile material with a liquid containing in dispersion from 2 to 20% by weight of the ammonium salt of an N-substituted polymeric styrene/maleamic acid in which 20 to 60% of the amide nitrogen atoms have two aliphatic hydrocarbon substituents containing a total of at least 18 carbon atoms in their combined chains, and in which each of the residual amide groups is selected from the class consisting of unsubstituted amide groups and amide groups having a single monovalent hydrocarbon substituent containing less than seven carbon atoms, and then baking the impregnated textile material at a temperature between 100° and 180° C.

7. A method for rendering textiles water-repellent which comprises impregnating a textile material with a liquid containing in dispersion from 2 to 20% by weight of the ammonium salt of an N-substituted polymeric styrene/maleamic acid in which 40 to 50% of the amide nitrogen atoms have two aliphatic hydrocarbon substituents containing a total of at least 18 carbon atoms in their combined chains, and in which each of the residual amide groups is selected from the class consisting of unsubstituted amide groups and amide groups having a single monovalent hydrocarbon substituent containing less than seven carbon atoms, and then baking the impregnated textile material at a temperature between 100° and 180° C.

8. An N-substituted polymeric styrene-maleamic acid in which 20 to 60% of the amide nitrogen atoms have a dioctadecyl group attached thereto, and in which each of the residual amide groups is selected from the class consisting of unsubstituted amide groups and amide groups having a single monovalent hydrocarbon substituent containing less than seven carbon atoms.

9. A water-repellent fabric impregnated with the baked reaction product of the ammonium salt of an N-substituted polymeric styrene/maleamic acid in which 20 to 60% of the amide nitrogen atoms have a dioctadecyl group attached thereto and in which each of the residual amide groups is selected from the class consisting of unsubstituted amide groups and amide groups having a single monovalent hydrocarbon substituent containing less than seven carbon atoms.

WITTY LYSLE ALDERSON, JR.

REFERENCES CITED

The following references are of record in the file of this patent:

UNITED STATES PATENTS

| Number | Name | Date |
|---|---|---|
| 2,279,410 | Nadeau et al. | Apr. 14, 1942 |
| 2,313,565 | McDowell et al. | Mar. 9, 1943 |
| 2,356,879 | Pense | Aug. 29, 1944 |
| 2,375,960 | Stoops | May 15, 1945 |